United States Patent [19]

Gregory et al.

[11] Patent Number: 5,383,960
[45] Date of Patent: Jan. 24, 1995

[54] INK JET PRINTING INKS

[75] Inventors: Peter Gregory, Bolton; Ronald W. Kenyon, Failsworth; Prahalad M. Mistry, Lancashire; John A. Taylor, Manchester, all of England

[73] Assignee: Zeneca Limited, London, England

[21] Appl. No.: 9,038

[22] Filed: Jan. 26, 1993

[30] Foreign Application Priority Data

Mar. 6, 1992 [GB] United Kingdom ............... 9204898
May 26, 1992 [GB] United Kingdom ............... 9211109

[51] Int. Cl.⁶ .............................................. C09D 11/02
[52] U.S. Cl. ............................... 106/22 K; 106/20 D; 534/797
[58] Field of Search ................. 106/22 K, 22 H, 20 D; 534/797; 8/638, 639, 644

[56] References Cited

U.S. PATENT DOCUMENTS

| | | | |
|---|---|---|---|
| 3,647,778 | 3/1972 | Andrew et al. | 534/634 |
| 4,536,220 | 7/1985 | Kondo et al. | 106/21 R |
| 4,581,071 | 4/1986 | Akutsu et al. | 106/22 H |
| 4,584,367 | 4/1986 | Matsuo et al. | 534/634 |
| 4,737,190 | 4/1988 | Shimada et al. | 106/22 K |
| 4,790,879 | 12/1988 | Baxter et al. | 106/22 K |
| 4,804,411 | 2/1989 | Eida et al. | 106/22 K |
| 4,908,062 | 3/1990 | Balmforth et al. | 106/22 K |
| 5,232,462 | 8/1993 | Tzikas | 8/638 |

FOREIGN PATENT DOCUMENTS

| | | |
|---|---|---|
| 42204 | 12/1981 | European Pat. Off. . |
| 168961 | 1/1986 | European Pat. Off. . |
| 372729 | 6/1990 | European Pat. Off. . |
| 468648 | 1/1992 | European Pat. Off. . |
| 148785 | 6/1981 | Germany . |
| 197579 | 8/1989 | Japan ................. 106/22 K |
| 1017271 | 1/1966 | United Kingdom . |

Primary Examiner—Helene Klemanski
Attorney, Agent, or Firm—Cushman Darby & Cushman

[57] ABSTRACT

An ink containing less than 5% inorganic compounds which comprises a liquid medium and a dye of the Formula (1):

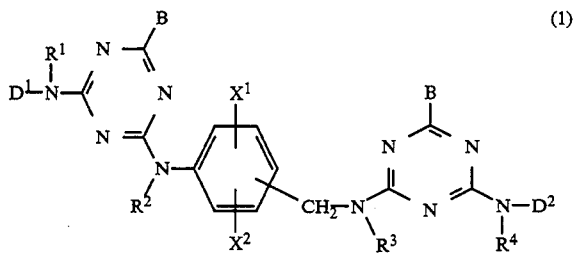

wherein:

$D^1$ and $D^2$ are each independently a chromophore of the azo series;

$R^1$, $R^2$, $R^3$ and $R^4$ are each independently H or optionally substituted alkyl;

B is a labile atom or group, hydroxy, amino or an ether, thioether or amine group; and $X^1$ and $X^2$ are each independently H, halo, alkyl, alkoxy, acylamino, ureido, nitro, carboxy or sulpho.

The inks may be used in ink jet printing either alone or with specified xanthene dyes.

12 Claims, No Drawings

INK JET PRINTING INKS

CHEMICAL COMPOSITIONS

This invention relates to inks, to a process for the coloration of paper using such inks, to compounds and compositions which may be used to prepare inks, and to a process for preparation of the compounds.

During recent years developments in ink jet printing technology have lead to desk-top printers capable of colouring paper with yellow, magenta and cyan prints. Magenta inks currently used often suffer from the problems of dull shade and poor light fastness leading to prints which fade, and poor wet fastness leading to prints which smudge. The present invention was conceived with these problems in mind.

According to a first aspect of the present invention there is provided an ink containing less than 5% inorganic compounds which comprises a liquid medium and a dye of the Formula (1):

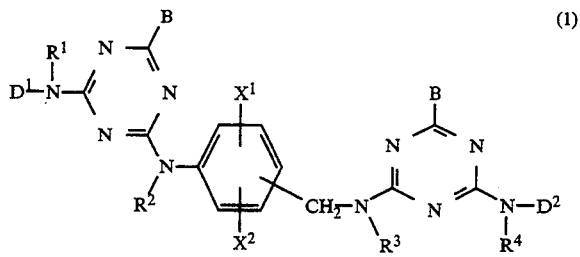

wherein:

$D^1$ and $D^2$ are each independently a chromophore of the azo series;

$R^1$, $R^2$, $R^3$ and $R^4$ are each independently H or optionally substituted alkyl;

B is a labile atom or group, hydroxy, amino or an ether, thioether or amine group; and $X^1$ and $X^2$ are each independently H, halo, alkyl, alkoxy, acylamino, ureido, nitro, carboxy or sulpho.

It is preferred that the ink contains less than 2%, more preferably less than 1% inorganic compounds. The term 'inorganic compounds' means any salt consisting of a metal cation and inorganic anion. As examples of inorganic compounds there may be mentioned alkali metal, alkali earth metal and transition metal halides, nitrates, nitrites, sulphates, carbonates and bicarbonates, especially NaCl, $NaNO_3$, $NaNO_2$, KCl, $NaHCO_3$, $CaCO_3$ and $CaCl_2$.

The liquid medium is preferably an aqueous medium. It is preferred that the dye of Formula (1) is completely dissolved in the liquid medium to form a solution.

The ink preferably contains from 0.5% to 20%, more preferably from 0.5% to 15%, and especially from 1% to 5%, by weight of the dye of Formula (1), based on the total weight of the ink.

The liquid medium is preferably water or a mixture comprising water and a water-soluble organic solvent, preferably in a weight ratio from 99:1 to 1:99, more preferably from 95:1 to 50:50 and especially from 90:10 to 60:40.

The water-soluble organic solvent is preferably a $C_{1-4}$-alkanol such as methanol, ethanol, n-propanol, isopropanol, n-butanol, sec-butanol, tert-butanol or iso-butanol; an amide such as dimethylformamide or dimethylacetamide; a ketone or ketone alcohol such as acetone or diacetone alcohol; an ether such as tetrahydrofuran or dioxane; a polyalkylene glycol such as polyethylene glycol or polypropylene glycol; an alkylene glycol or thioglycol containing a C2-C6 alkylene group such as ethylene glycol, propylene glycol, butylene glycol or triethylene glycol; a thiodiglycol, hexylene glycol, or diethylene glycol; a polyol such as glycerol or 1,2,6-hexanetriol: a lower alkyl ether of a polyhydric alcohol such as 2-methoxyethanol, 2-(2-methoxyethoxy)ethanol, 2-(2-ethoxyethoxy)- ethanol, 2-[2-(2-methoxyethoxy)ethoxy]ethanol, 2-[2-(2-ethoxyethoxy)ethoxy]-ethanol; 2-pyrrolidone or N-methylpyrrolidone; or a mixture containing two or more of the aforementioned water-soluble organic solvents.

Especially preferred water-soluble organic solvents are selected from 2-pyrrolidone, N-methylpyrrolidone, an alkylene glycol or lower alkyl ether of a polyhydric alcohol such as ethylene glycol, diethylene glycol, triethylene glycol or 2-methoxy-2-ethoxy-2-ethoxyethanol; and a polyethylene glycol with a molecular weight of up to 500. A preferred specific solvent mixture is a binary mixture comprising water and either diethylene glycol, 2-pyrrolidone or N-methylpyrrolidone in a weight ratio as mentioned above.

Examples of suitable ink media are given in U.S. Pat. Nos. 4,963,189, 4,703,113, 4,626,284 and EP 4,251,50A.

It is preferred that the inks of the present invention further comprise one or more of a penetrant to assist permeation of the dye into a paper substrate, a kogation-reducing agent to prevent or reduce the build-up of residue (koga) on the resistor surface in thermal ink jet printers and a buffer such as sodium borate, to stabilise the pH of the ink.

The kogation-reducing agent is preferably an oxo anion, such as described in EP 425150A. The oxo-anion may be $C_2O_4^{2-}$, $SO_3^{2-}$, $SO_4^{2-}$, molybdate, $AsO_4^{3-}$ or more preferably a phosphate ester, a diorganophosphate or more especially a phosphate salt which is particularly effective in reducing kogation.

As examples of phosphate salts there may be mentioned dibasic phosphate ($HPO_4^{2-}$) monobasic phosphates ($H_2PO_4^-$) and polyphosphates ($P_2O_7^{4-}$). The selection of counter ion is not believed to be critical and examples include alkali metals, ammonium and alkylammonium cations.

The kogation-reducing agent is preferably present in the ink at a concentration from 0.001% to 1%, based on oxo-anion, and more preferably from 0.01% to 0.5% (by weight).

The inks of the present invention are of particular value in ink jet printing of paper. We have found that paper printed with the inks show acceptable water-fastness properties, a particularly bright shade and good light fastness. The finding that certain dyes of the invention have exceptional brightness on paper is particularly surprising because superficially similar dyes printed on paper have been found to be less bright.

It is preferred that $D^1$ and $D^2$ are each independently a sulphonated monoazo radical, especially a phenylazonaphthalene radical, more especially an azonaphthalene radical because of its attractive shade.

A preferred sulphonated monoazo radical represented by $D^1$ or $D^2$ is of the Formula (2) or (3):

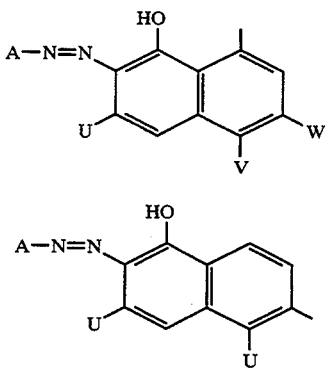

(2)

(3)

wherein:

U is sulpho;

one of V and W is sulpho and the other is H; and

A is a radical of the benzene of naphthalene series.

Particularly preferred dyes contain sulphonated monoazo radicals of Formula (2) or (3) wherein A is a phenyl having 1 or 2 sulpho or carboxy groups or naphthyl having 1, 2 or 3 sulpho or carboxy groups. It is especially preferred that A has a sulpho group in an ortho position relative to the azo link.

As examples of phenyl radicals having 1 or 2 sulpho or carboxy groups there may be mentioned phenyl; 2-, 3- or 4-sulphophenyl; 2,4-, 2,5- or 3,5-disulphophenyl; 2-methyl-4-sulphophenyl; 2-methyl-5-sulphophenyl; 4-methyl-2-sulphophenyl; 2-sulpho-5-methylphenyl; 2-methoxy-5-sulphophenyl; 4-methoxy-2-sulphophenyl; 2-chloro-4-sulphophenyl; 2-chloro-5-sulphophenyl; 2,5-dichloro-4-sulphophenyl; 4-nitro-5-sulphophenyl; 5-nitro-2-sulphophenyl; 2-carboxy-5-sulphophenyl; and 3,5-and 3,4-dicarboxyphenyl.

As Examples of particularly preferred naphthyl radicals having 1, 2 or 3 sulpho or carboxy groups there may be mentioned 4-, 5-, 6- or 7-sulphonaphth-1-yl; 1- or 6-sulphonaphth-2-yl; 3,8- or 4,8-disulphonaphth-1-yl; 4,8- or 5,7-disulphonaphth-2-yl; 2,5,7- or 3,5,7-trisulphonaphth-2-yl; 1,5,7 or 3,6,8-trisulphonaphth-2-yl; 6-carboxy-8-sulphonaphth-2-yl and 6-carboxynaphth-2-yl.

Especially preferred radicals represented by A are of Formula (4) or (5):

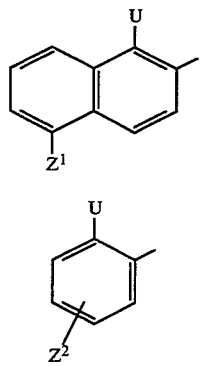

(4)

(5)

wherein:

$Z^1$ is H or sulpho;

U is sulpho; and $Z^2$ is H; sulpho; $C_{1-4}$-alkyl, especially methyl; or $C_{1-4}$-alkoxy, especially methoxy.

It is preferred that $D^1$ and $D^2$ are the same as each other.

Optionally substituted alkyl radicals which may be represented by $R^1$, $R^2$, $R^3$ and $R^4$ include $C_{1-4}$-alkyl and $C_{1-4}$-alkyl substituted by a halogen, hydroxy, cyano, carboxy or alkoxy group.

It is preferred that $R^1$ is the same as $R^4$.

By labile atom or group it is meant any atom or group attached directly to the triazine ring which is displaceable by a nucleophile under alkaline conditions. The preferred labile atom is a halogen, especially F or Cl. The preferred labile group is sulpho, more preferably a quaternary ammonium group. As examples of quaternary ammonium groups there may be mentioned trialkyl ammonium groups and optionally substituted pyridinium groups, especially 3-carboxypyridinium and 4-carboxypyridinium groups.

$X^1$ and $X^2$ are preferably each independently H; Cl; $C_{1-4}$-alkyl, especially methyl; $C_{1-4}$-alkoxy, especially methoxy; carboxy or sulpho. It is particularly preferred that $X^1$ and $X^2$ are H.

When B is an ether group it is preferably —O—($C_{1-4}$-alkyl), especially methoxy.

When B is a thioether group it is preferably —S—($C_{1-4}$-alkyl), especially —S—CH$_3$.

When B is an amine group it preferably contains less than 13 carbon atoms. Preferred amine groups represented by B are of the formula:

wherein:

$R^5$ and $R^6$ are each independently H; optionally substituted phenyl; $C_{1-4}$-alkyl; hydroxy-$C_{1-4}$-alkyl, especially hydroxyethyl; —(CH$_2$CH$_2$NH)$_x$CH$_2$CH$_2$NH$_2$ wherein x is 2, 3 or 4; or $R^5$ and $R^6$ together with the nitrogen to which they are attached form a 5 or 6 membered ring, especially a morpholine or piperidine ring.

When $R^5$ or $R^6$ is optionally substituted phenyl the optional substituent or substituents are preferably selected from $C_{1-4}$-alkyl, especially methyl; $C_{1-4}$-alkoxy, especially methoxy; halo, especially chloro; sulpho and carboxy.

As examples of amine groups there may be mentioned methylamino, ethylamino, butylamino, dimethylamino, diethylamino, morpholino, piperidino, hydroxyethylamino, diethanolamino, phenylamino, 3 or 4-carboxyphenylamino, 3,4- or 3,5-dicarboxyphenylamino, 2-, 3- or 4-sulphophenylamino and 2-methyl-4-sulphophenylamino.

According to a second aspect of the present invention there is provided a dye of Formula (1) as shown above, wherein $D^1$, $D^2$, $R^1$, $R^2$, $R^3$, $R^4$, $X^1$ and $X^2$ are as hereinbefore defined and B is an amino, ether, thioether or amine group. Preferred ether and amine groups are as hereinbefore described.

The dyes of the invention may be prepared by a process comprising the condensation of one mole of an o-, m- or p-aminobenzylamine of the Formula (8):

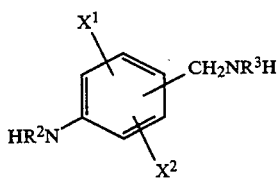

(8)

with a triazine compound of the Formula (9a) followed by condensation with a triazine compound of the Formula (9b):

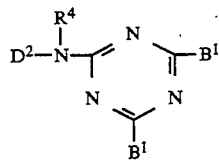

(9a)

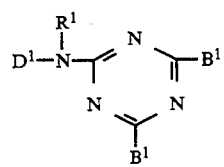

(9b)

wherein:

$D^1$, $D^2$, $R^i$, $R^2$, $R^3$, $R^4$, $X^1$ and $X^2$ are as defined above and $B^1$ is a labile atom or group as described above.

When the groups $D^2$-$NR^4$- and $D^1$-$NR^1$- are identical one mole of the aminobenzylamine of Formula (8) may simply be condensed with about two moles, preferably from 1.7 to 2.3 moles, of the triazine compound of Formula (9a).

Dyes of Formula (1) in which B is a hydroxy, amino or an ether, thioether or amine group may be prepared by condensing a reactive dye of Formula (1) in which B is a labile atom or group with respectively water or ammonium hydroxide or an ethoxide, thioethoxide or an amine, optionally in the presence of an alkali.

The aminobenzylamine and triazine compounds are preferably condensed in an aqueous medium, optionally in the presence of a water-soluble organic solvent, at a temperature of from 20° to 60° C., and preferably maintaining the pH at from 5 to 9 by adding an acid-binding agent to neutralise any hydrogen halide formed during the condensation. Suitable acid-binding agents are alkali metal hydroxides, carbonates and bicarbonates.

As examples of diamines of Formula (8) there may be mentioned the three isomeric aminobenzylamines and derivatives in which one or both nitrogen atoms have a $C_{1-4}$-alkyl substituent.

Compounds of Formula (9a) and (9b) may be obtained, for example, by reacting cyanuric chloride at 0°–20° C. in aqueous medium, with a water-soluble compound of the formulae $D^2NR^4H$ or $D^1NR^1H$ wherein $D^1$, $D^2$, $R^1$ and $R^4$ are as defined above. Such compounds have been fully described in the prior art and especially include monoazo dyes obtained from diazotising an amine, for example an aniline or naphthylamine, and coupling with a coupling component having a substituent defined by —$NR^4H$ or —$NR^1H$, for example a hydroxynaphthylamine.

The above-mentioned diazotisation may be achieved using methods known per se in the dyestuff art, for example by reacting the amine with an acidic solution of $NaNO_2$ at below 5° C.

Examples of the aforementioned coupling components include 1-hydroxy-8-aminonaphthalene-3,6-disulphonic acid, 1-hydroxy-8-aminonaphthalene-3,5-disulphonic acid, 1-hydroxy-6-aminonaphthalene-3-sulphonic acid, 1-hydroxy-6-methylaminonaphthalene-3-sulphonic acid, 1-hydroxy-7-aminonaphthalene-3-sulphonic acid, 1-hydroxy-7-methylaminonaphthalene-3-sulphonic acid, and 1-hydroxy-6-aminonaphthalene-3,5-disulphonic acid.

It is convenient to isolate and use the dyes in the form of their water-soluble salts, particularly their alkali metal (especially sodium) salt and especially their ammonium or substituted ammonium salts. It is to be understood that the invention relates to both the free acids and their salts.

Preferred substituted ammonium salts are of formula $^+NT_4$ or $^+NHT_3$ wherein each T independently is $C_{1-4}$-alkyl or two or three Ts taken together with the nitrogen atom to which they are attached from a 5- or 6-membered heterocyclic ring and any remaining T is $C_{1-4}$-alkyl. Preferably each T independently is selected from $C_{1-4}$-alkyl. Examples of substituted ammonium salts of formula $^+NT_4$ or $^+NHT_3$ include $(CH_3)_3N^+H$, $(CH_3)_2N^+H_2$, $H_2N^+(CH_3)(CH_2CH_3)$, $CH_3N^+H_3$, $CH_2CH_2N^+H_3$, $H_2N^+(CH_2CH_3)_2$, $CH_3CH_2CH_2N^+H_3$, $CH_3CH_2CH_2N^+H_3$, $(CH_3)_2CNH^+H_3$, pyridinium, piperidinium, morpholinium, $N^+(CH_3)_4$, $N^+(CH_2CH_3)_4$, N-methyl pyridinium, N,N-dimethyl piperidinium and N,N-dimethyl morpholinium.

Reactions for preparing dyes of the invention may be performed using analogous conditions to those known in the art. Similarly, the dyes may be isolated by known methods, for example spray drying or precipitation and filtration.

Inorganic compounds may be substantially removed from the dyes by processes known per se, for example reverse osmosis, ultrafiltration, dialysis or a combination thereof. Removal of the inorganic compounds enables inks to be prepared which are particularly suited for ink jet printing.

According to a further aspect of the present invention there is provided a composition comprising a dye of the Formula (1) as defined in the first aspect of the present invention and a dye of Formula (10):

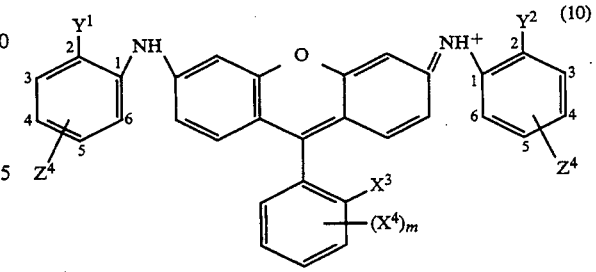

(10)

wherein:

$X^3$ is a sulpho or carboxy group;
each $X^4$ independently is a substituent;
m has a value of from 0 to 2;
$Y^1$ and $Y^2$ are each independently alkyl or halo; and
$Z^4$ is a carboxy group.

When $X^3$ is a carboxy group it is preferred that one or both of the groups represented by $Z^4$ are at the 3-, 4- or 5-position, more preferably at the 3- or 5-position because we have found that such compounds usually have better solubility in aqueous media than analogous compounds wherein the groups represented by $Z^4$ are at the 4- or 6-position.

It is preferred that $X^3$ is a carboxy group.

The nature and position of the substituent or substituents defined by $-(X^4)_m$ is generally selected on the basis of synthetic convenience. It is preferred that each $X^4$ independently contains less than 7 carbon atoms. As examples of substituents represented by $X^4$ there may be mentioned halo, especially chloro; sulpho; alkyl, especially $C_{1-4}$-alkyl; alkoxy, especially $C_{1-4}$-alkoxy; and carboxy. It is preferred that m has a value of 1, more preferably 0.

As will be appreciated the compound of Formula (10) can exist in other tautomeric forms than that shown and these are intended to be included in the definition provided by Formula (10).

When $Y^1$ or $Y^2$ is an alkyl group it preferably has less than seven carbon atoms, and more preferably is $C_{1-4}$-alkyl, especially methyl. When $Y^1$ or $Y^2$ is halo it is preferably Chloro. It is preferred that $Y^1$ and $Y^2$ are identical to each other.

It is preferred that one or both of the groups represented by $Z^4$ are at the 5-position indicated in Formula (10).

The positive charge shown in Formula (10) may be balanced by a negatively charged carboxy or sulpho group in the same molecule or by an anion of a different molecule or atom. The anion is preferably colourless. Examples of colourless anions include carbonate, bicarbonate, sulphate, sulphite, phosphate, halide, acetate and benzoate.

The compound of Formula (10) preferably has at least as many carboxy groups as sulpho groups.

The compounds of Formula (10) may be prepared by condensing together compounds of Formula (11), (12) and (13) wherein m, $X^3$, $Y^1$, $Y^2$ and $Z^4$ are as hereinbefore defined and $X^5$ is C=O or $SO_2$:

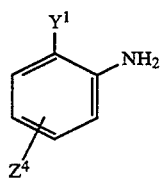
(11)

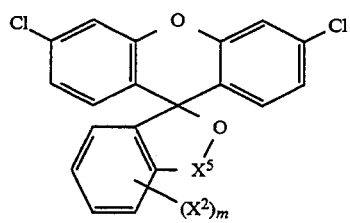
(12)

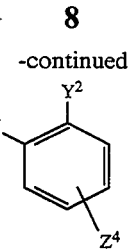
(13)

Condensation of compounds (11), (12) and (13) is preferably performed at a high temperature, more preferably above 150° C., especially in the range 170°–190° C. The condensation may be performed in a high boiling solvent, for example sulpholane.

The relative amounts of the dyes of Formula (1) and (10) may be varied between wide limits, preferably so as to ensure that the composition has acceptable brightness and light fastness for practical use in ink jet printing. It is preferred that the relative amounts (by weight) of the dye of Formula (10) and the dye of Formula (1) are in the range 95:5 to 5:95, more preferably 90:10 to 10:90.

The present invention also provides inks comprising a composition as hereinbefore described and a liquid medium. The liquid medium is preferably as described in the first aspect of the present invention.

A further aspect of the present invention provides a process for printing a substrate with an ink using an ink jet printer, characterised in that the ink is as defined in the first aspect of the present invention or contains a dye or composition according to the present invention.

A suitable process for the application of an ink as hereinbefore defined comprises forming the ink into small droplets by ejection from a reservoir through a small orifice so that the droplets of ink are directed at a substrate. This process is commonly referred to as ink jet printing, and the ink jet printing processes for the present inks are preferably piezoelectric ink jet printing, and more especially thermal ink jet printing. In thermal ink jet printing, programmed pulses of heat are applied to the ink by means of a resistor, adjacent to the orifice during relative movement between the substrate and the reservoir.

A preferred substrate is an overhead projector slide or a paper, especially plain paper, which may have an acid, alkaline or neutral character.

According to a still further aspect of the present invention there is provided a paper or an overhead projector slide printed with an ink according to the first aspect of the invention or a dye according to the second aspect of the invention.

The inks of the present invention may be used in admixture with other colorants and inks or separately with other colorants and inks in an ink jet printer to give a printer capable of printing a variety of colours and shades. Suitable other colorants and inks for use with the invention are described in GB Patent application 9204903.0, EP 468647 A1, EP 468648 A1 and EP 468649 A1.

The invention is further illustrated by the following Examples in which all parts and percentages are by weight unless otherwise indicated.

EXAMPLE 1

Preparation of

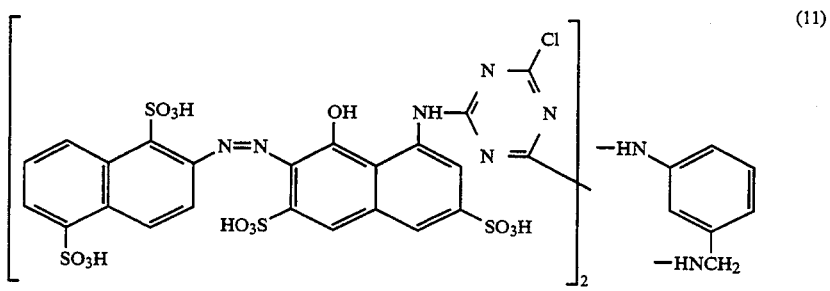

(11)

Stage 1

A solution of 3-aminobenzylamine (0.59 g) in acetone (10 ml) was added to a stirred solution of 1-hydroxy-2-(1',5'-disulphonaphth-2'-yl-azo)-8-(4",6""-dichloro-s-triazin-2"-ylamino)-naphthalene-3,6-disulphonic acid (21.89 g, M.I. 2188) in water (200 ml). The reaction mixture was stirred at 20° C. and pH 6 to 7 for 2 hours, then at 30° C. to 35° C. and pH 8.0 to 8.5 for 3 hours. After filtering to remove any traces of insoluble product, ethanol was added and the precipitated bluish-red dye which resulted was collected and dried.

Yield 14.6 g, M.I. 2737.

Stage 2 —Removal of Inorganic Compounds 58.88 g of the title dye obtained by a method analogous to Stage 1 was suspended water (400 ml) and dialysed to remove inorganic compounds. The water was evaporated to give the title dye in the form of its sodium salt. When made into an ink and printed onto plain paper using a thermal ink jet printing machine, the printed image was found to have moderate water fastness (about 60%) and an attractive bright shade.

The title dye was found to have an $E_{max}$ of 70,000 at 543 nm and a brightness of 69, as measured on a Minolta Chroma Meter.

Examples of specific inks containing the title dye are:

| Ink | Dye (parts) | Liquid medium and other components (parts) |
|---|---|---|
| 1 | 2.5 | Water (60) |
|   |     | Ethylene glycol (40) |
| 2 | 4.0 | Water (85) |
|   |     | Diethylene glycol (15) |
| 3 | 5.0 | Water (90) |
| 4 | 3.0 | N-methylpyrrolidone (10) |
|   |     | Ammonium phosphate (0.2) |
|   |     | Water (65) |
|   |     | Glycerol (25) |
|   |     | Triethanolamine (10) |
| 5 | 2.0 | Water (80) |
|   |     | Ethylene glycol (15) |
|   |     | Polyethylene glycol (MW 200) (5) |
| 6 | 2.5 | Water (80) |
|   |     | Diethylene glycol (20) |
|   |     | Sodium borate (0.2) |
| 7 | 3.0 | Water (92.5) |
|   |     | Diethylene glycol (7.5) |
|   |     | Dimethyl phosphate (0.3) |
|   |     | Monomethyl phosphate (0.2) |

Further inks containing the produce from stage 2 may be prepared according to the following formulations shown in Table I and Table II wherein figures denote parts by weight for each stated component:

The following Abbreviations are used:
PG=propylene glycol,
DEC=diethylene glycol,
NMP=N-methyl pyrollidone,
DMK=dimethylketone,
IPA=isopropanol,
MEOH=methanol,
P=2-pyrollidone,
MIBK=methylisobutyl ketone,
P12=Propane-1,2-diol,
BDL=Butane-2,3-diol,
GET=Cetyl ammonium bromide (a surfactant),
BAS=1:1 mixture by weight of ammonia and methylamine,
PHO=Na$_2$HPO$_4$, and
TBT=Tertiary butanol.

TABLE I

| Ink No. | Dye Content | Water | PG | DEG | NMP | DMK | NaOH | Na Stearate | IPA | MEOH | 2P | MIBK | BAS |
|---|---|---|---|---|---|---|---|---|---|---|---|---|---|
| 1 | 2.0 | 80 | 5 |    | 6  | 4  |     |     |   |    | 5  |    | 3 |
| 2 | 3.0 | 90 |   | 5  | 2  |    | 0.2 |     |   |    |    |    |   |
| 3 | 1.0 | 85 | 5 |    | 2  | 2  |     | 0.1 |   | 5  | 1  |    |   |
| 4 | 2.1 | 91 |   | 8  |    |    |     |     |   |    |    | 1  |   |
| 5 | 3.1 | 86 | 5 |    |    |    |     | 0.2 | 4 |    |    | 5  |   |
| 6 | 1.1 | 81 |   |    | 9  |    | 0.5 | 0.5 |   |    | 9  |    |   |
| 7 | 2.5 | 60 | 4 | 15 | 3  | 3  |     |     | 6 | 10 | 5  | 4  |   |
| 8 | 1.9 | 70 |   | 20 |    |    |     |     | 10|    |    |    |   |
| 9 | 2.4 | 75 | 5 | 4  |    |    |     |     |   | 6  |    | 5  | 5 |
| 10| 4.1 | 80 | 3 | 5  | 2  | 10 |     | 0.3 |   |    |    |    |   |
| 11| 3.2 | 65 |   | 5  | 4  | 6  |     |     | 5 | 4  | 6  | 5  |   |
| 12| 4.6 | 96 |   |    |    |    |     |     |   | 4  |    |    |   |
| 13| 0.8 | 90 | 5 |    |    |    |     |     | 5 |    |    |    |   |
| 14| 1.2 | 80 | 2 | 6  | 1  | 5  |     |     | 1 |    | 4  |    | 1 |
| 15| 1.8 | 80 |   | 5  |    |    |     |     |   | 15 |    |    |   |
| 16| 2.6 | 84 |   |    | 11 |    |     |     |   |    | 5  |    |   |
| 17| 3.3 | 80 | 2 |    | 10 |    |     |     |   | 2  |    | 6  |   |

TABLE I-continued

| Ink No. | Dye Content | Water | PG | DEG | NMP | DMK | NaOH | Na Stearate | IPA | MEOH | 2P | MIBK | BAS |
| --- | --- | --- | --- | --- | --- | --- | --- | --- | --- | --- | --- | --- | --- |
| 18 | 1.7 | 90 | | | | 7 | 0.3 | | 3 | | | | |
| 19 | 1.5 | 69 | 2 | 20 | 2 | 1 | | | | | 3 | 3 | |
| 20 | 1.6 | 91 | | | 4 | | | | | | 4 | | 1 |

TABLE II

| Ink No. | Dye Content | Water | PG | DEG | NMP | CET | TBT | Na Stearate | BDL | PHO | 2P | PI2 |
| --- | --- | --- | --- | --- | --- | --- | --- | --- | --- | --- | --- | --- |
| 21 | 3.0 | 80 | 15 | | | 0.2 | | | | | 5 | |
| 22 | 2.0 | 90 | | 5 | | | | | | 1.2 | | 5 |
| 23 | 1.5 | 85 | 5 | 5 | | 0.15 | 5.0 | 0.2 | | | | |
| 24 | 2.5 | 90 | | 6 | 4 | | | | | 0.12 | | |
| 25 | 3.1 | 82 | 4 | 8 | | 0.3 | | | | | | 6 |
| 26 | 0.9 | 85 | | 10 | | | | | 5 | 0.2 | | |
| 27 | 1.5 | 90 | | 5 | 5 | | | 0.3 | | | | |
| 28 | 2.9 | 70 | | 10 | 4 | | | | 1 | | 4 | 11 |
| 29 | 2.2 | 75 | 4 | 10 | 3 | | | | 2 | | 6 | |
| 30 | 2.6 | 91 | | | 6 | | | | | | 3 | |
| 31 | 3.2 | 76 | | 9 | 7 | | 3.0 | | | 0.95 | 5 | |
| 32 | 4.0 | 78 | 5 | 11 | | | | | | | 6 | |
| 33 | 3.3 | 86 | | | 7 | | | | | | 7 | |
| 34 | 1.1 | 70 | 5 | 5 | 5 | 0.1 | 0.2 | 0.1 | 5 | 0.1 | 5 | 5 |

EXAMPLE 2

The method of Example 1, stage 1, was repeated except that in place of 3-aminobenzylamine there was used 3-amino-N-methylbenzylamine (0.68 g). The resultant product was collected as described in Example 1 to give 14.1 g of a bluish-red dye. The dye may be dialysed to remove chloride ions, inorganic compounds and made into an ink as described in Example 1, stage 2.

EXAMPLE 3

Preparation of

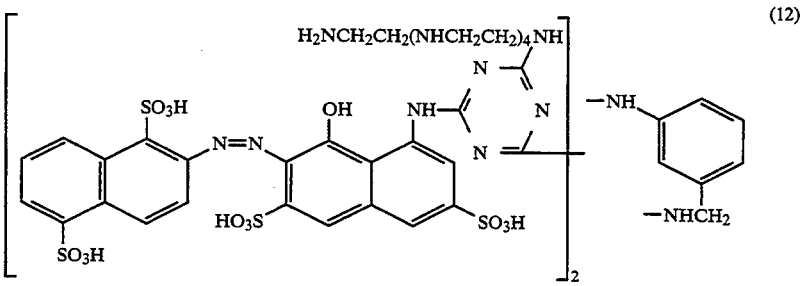

(12)

13.79 g of the product from Example 1, stage 1, was added to water (500 ml) followed by pentaethylene hexamine (9.0g). The mixture was stirred until a complete solution was obtained at about pH 10. The solution was maintained at 70°–75° C. for about 2 hours until reaction was essentially complete. After cooling to 20° C, the solution was neutralised to pH 7 using concentrated hydrochloric acid. The precipitated product was filtered off and washed with (100ml) of water. The product was dissolved in water (200ml) and dialysed to remove chloride ions, inorganic compounds and the solvent evaporated to give the title dye having a water fastness of approximately 86%.

EXAMPLE 4

A solution of 1-hydroxy-2-(2'-sulphophenylazo)-8-(4",6"-dichloro-s-triazine-2''-ylamino)-naphthalene-3,6-disulphonic acid (27.6 g, M.I. 1380, 0.02 mole) and 3-amino-N-methylbenzylamine (1.36 g, 0.1 mole) was stirred at 20° to 25° C. and pH 6 for 0.5 hours followed by 3 hours at 30° to 35° C. and pH 8.5. On cooling, the pH was adjusted to 7.0 with 2N hydrochloric acid, a small amount of insoluble matter was filtered off and salt solution (22% w/v) was added with stirring. The precipitated product was collected, washed with brine (20%) and dried.

Yield 18.0 g, M.I. 2000.

The product may be dialysed and made into an ink as described in Example 1, stage 2.

EXAMPLE 5

A solution of 1-hydroxy-2-(1',5'-disulphonaphth-2'-ylazo)-6-(4",6"-dichloro-s-triazinylamino)-naphthalene-3,5-disulphonic acid (22.6 g, M.I. 1355, 0.0167 mole) and 2-aminobenzylamine (1.016 g, 0.0083 mole) was stirred at pH 8 and 35° C. for 2 hours. Further 2-aminobenzylamine (0.2 g) was added and heating continued for a further 2 hours. On cooling to 20° C., salt (25% w/v) was added and the mixture was stirred for 16 hours. Precipitated solid was collected and dried.

Yield 31.0 g, M.I. 3728.

The product may be dialysed and made into an ink as described in Example 1, stage 2.

EXAMPLE 6

A solution of 3-amino-N-methylbenzylamine (1.36 g) in acetone (20 ml) was added to a stirred solution of 1-hydroxy-2-(1'-sulphonaphth-2'-ylazo)-8-(4",6"-dichloro-1-triazin-2''-ylamino)naphthalene-3,6-disulphonic acid (21.28g, M.I. 1064). After stirring at pH 6 and 20° C. for 1 hour, the temperature was maintained at 35° C. for 28 hours. Any insoluble material was filtered off, the filtrate concentrated to 100 ml and the bluish-red dye precipitated by adding ethanol with stirring.

Yield 20.4g, M.I. 2065.

The product may be dialysed and made into an ink as described in Example 1, stage 2.

EXAMPLES 7 to 10

Further dyes prepared by a similar procedure are listed in Table III, the chlorotriazine group being attached to the coupling component. The dyes may be made into inks as described in Example 1.

TABLE III

| Example | Diazo Component | Coupling Component | Linking Diamine | Shade |
|---|---|---|---|---|
| 7 | 2-amino-naphthalene-1,5-disulpho | 1-hydroxy-8-amino-naphthalene-3,6-disulpho | o-amino-benzylamine | Bluish-red |
| 8 | 2-amino-naphthalene-1-sulpho | 1-hydroxy-8-amino-naphthalene-3,6-disulpho | m-amino-benzylamine | Bluish-red |
| 9 | 2-amino-naphthalene-1,5-disulpho | 1-hydroxy-8-amino-naphthalene-3,6-disulpho | N-beta-hydroxyethyl-m-amino-benzylamine | Bluish-red |
| 10 | 2-amino-naphthalene-1-sulpho | 1-hydroxy-8-amino-naphthalene | 3-amino-benzylamine | Bluish-red |

EXAMPLE 11 —Composition and Inks

Preparation of the compound of Formula (13) where X is carboxy and $Q^1$ and $Q^2$ are both 2-methyl-5-carboxyphenyl

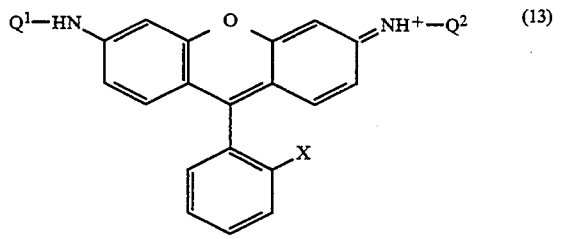

3,5-disulpho

A mixture of 3,6-dichlorofluoran (7.4g), 3-amino-4-methylbenzoic acid (9.1 g), zinc chloride (4.2 g) and sulpholane (20 g) was stirred at 180° C. for 3 hours. After cooling, the mixture was added to ice/water (200 g) and concentrated hydrochloric acid (10 ml) was added. The resultant precipitate was filtered off and washed with water.

The precipitate was added to water (600 ml) and the pH adjusted to 9.0–9.5 by addition of sodium hydroxide solution. The solution was screened and the filtrate acidified to pH 3 with concentrated hydrochloric acid. The title product in the free acid form was filtered off and washed with a little water to give a solid.

The solid was added to water (600 ml) and concentrated ammonium hydroxide added to pH 9–9.5. The solution was dialysed until no further chloride ion was detected, the solution was screened, and the water evaporated to give the title compound as the ammonium salt.

Preparation of Ink

A composition may be prepared by mixing 3.2 parts of the compound of Formula (13) and 0.8 parts of the compound of Formula (11). The composition may be dissolved in a mixture of water (92.5 parts) and diethylene glycol (7.25 parts) to give an ink. When printed onto plain paper using a thermal ink jet printer the printed image has good light fastness and a bright magenta shade.

Further inks may be prepared according to the formulations described in Example 1, Tables I and II except that in place of the dye of Example 1 there is used the above composition.

EXAMPLE 12

Preparation of the compound of Formula (14) wherein B is hydroxy

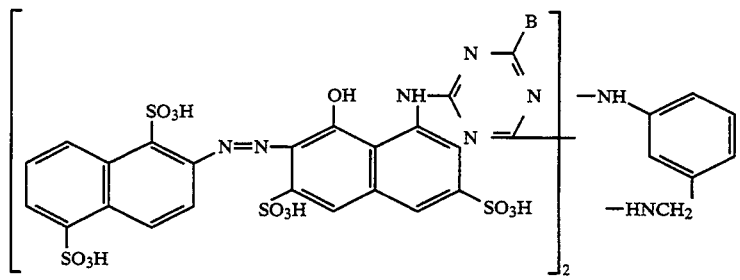

The product from Example 1, Stage 1, (27.37 g) and sodium hydroxide (40 g) were added to water (500 ml) and the mixture stirred at 75°–80° C. for about 4 hours. After cooling to 20° C. the solution was neutralised using concentrated hydrochloric acid. The precipitated product was filtered off, washed with 20% brine solution, dissolved in water (200 ml), dialysed to remove chloride ions, and the water evaporated to give the title dye.

EXAMPLES 13 to 16

The method of Example 12 may be repeated except that in place of sodium hydroxide there is used the basic compound listed in Table IV below to give a compound of Formula (14) wherein B is as indicated in the final column.

TABLE IV

| Example | Basic Compound | B |
|---|---|---|
| 13 | Ammonium hydroxide (12 ml) | $-NH_2$ |
| 14 | Ethanolamine (8 g) | $-NHCH_2CH_2OH$ |
| 15 | Butylamine (8.52 g) | $-NH(CH_2)_3CH_3$ |
| 16 | Diethanolamine (12.6 g) | $-N(CH_2CH_2OH)_2$ |

We claim:

1. An ink containing less than 5% inorganic compounds which comprise a liquid medium and a dye of the Formula (1):

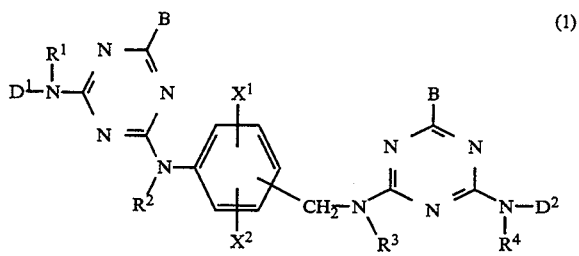

(1)

wherein:
- $D^1$ and $D^2$ are each independently a chromophore of the azo series;
- $R^1$, $R^2$, $R^3$ and $R^4$ are each independently H or optionally substituted alkyl;
- B is a labile atom or group, hydroxy, amino or an ether, thioether or amine group; and
- $X^1$ and $X^2$ are each independently H, halo, alkyl, alkoxy, acylamino, ureido, nitro, carboxy or sulpho; and wherein the liquid medium comprises water and a water-soluble organic solvent in a weight ratio of 95:1 to 50:50.

2. An ink according to claim 1 wherein the dye is in the form of its ammonium or substituted ammonium salt.

3. An ink according to claim 1 wherein the dye of Formula (1) is completely dissolved in the liquid medium to form a solution.

4. An ink according to claim 1 which contains from 0.5% to 20% by weight of the dye of Formula (1), based on the total weight of ink.

5. An ink according to claim 1 wherein the water-soluble organic solvent is 2-pyrrolidone, N-methylpyrrolidone, ethylene glycol, diethylene glycol or triethylene glycol.

6. An ink according to claim 1 wherein $D^1$ and $D^2$ are each independently a sulphonated monoazo radical.

7. An ink according to claim 6 wherein $R^1$, $R^2$, $R^3$ and $R^4$ are each independently H or $C_{1-4}$-alkyl.

8. An ink according to claim 1 wherein:
- $D^1$ and $D^2$ are each independently a sulphonated monoazo radical;
- $R^1$, $R^2$, $R^3$ and $R^4$ are each independently H or $C_{1-4}$-alkyl;
- B is a halogen, 3-carboxypyridinium, 4-carboxypyridinium, —O—($C_{1-4}$-alkyl), —S—($C_{1-4}$-alkyl), or an amine group of the formula:

wherein
$R^5$ and $R^6$ are each independently H; optionally substituted phenyl wherein the optional substituent or substituents are selected from $C_{1-4}$alkyl, $C_{1-4}$-alkoxy, halo, sulpho and carboxy; $C_{1-4}$-alkyl; hydroxy-$C_{1-4}$-alkyl; —(CH$_2$CH$_2$NH)x CH$_2$CH$_2$NH$_2$ wherein x is 2, 3 or 4; or $R^5$ and $R^6$ together with the nitrogen to which they are attached form a morpholine or piperidine ring.

9. An ink according to claim 1 which further contains a dye of Formula (10):

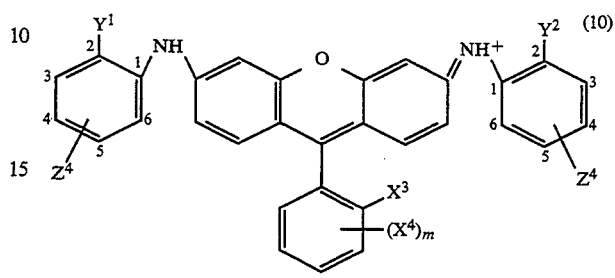

wherein
- $X^3$ is a sulpho or carboxy group;
- each $X^4$ independently is a substituent;
- m has a value of from 0 to 2;
- $Y^1$ and $Y^2$ are each independently alkyl or halo; and
- $Z^4$ is a carboxy group.

10. An ink according to claim 9 wherein the relative amounts of the dye of Formula (10) and the dye of Formula (1) are in the range 95:5 to 5:95.

11. A dye of Formula (1):

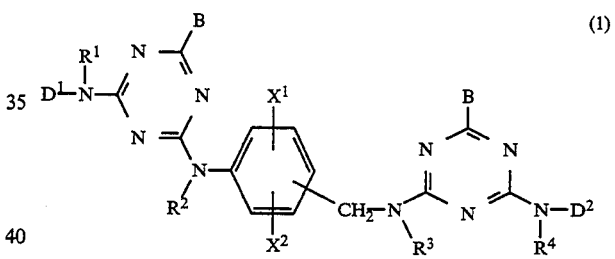

wherein:
- $D^1$ and $D^2$ are each independently a chromophore of the azo series;
- $R^1$, $R^2$, $R^3$ and $R^4$ are each independently H or optionally substituted alkyl;
- B is an amino, ether, thioether or amine group; and
- $X^1$ and $X^2$ are each independently H, halo, alkyl, alkoxy, acylamino, ureido, nitro, carboxy or sulpho.

12. A process for printing a substrate with an ink using an ink jet printer comprising forming the ink into small droplets by ejection from a reservoir through a small orifice so that the droplets are directed at the substrate, characterised in that the ink is as defined in claim 1.

* * * * *